United States Patent [19]

Lovell

[11] 3,863,035

[45] Jan. 28, 1975

[54] CALL CONCENTRATOR SWITCHING MATRIX

[75] Inventor: Clarence A. Lovell, McLean, Va.

[73] Assignee: Lynch Communication Systems, Inc., San Francisco, Calif.

[22] Filed: June 20, 1972

[21] Appl. No.: 264,517

[52] U.S. Cl. .... 179/18 FC, 179/18 AA, 179/18 GE

[51] Int. Cl. .... H04q 3/60

[58] Field of Search .... 179/18 FC, 18 GE, 18 AA, 179/18 GF, 18 E

[56] References Cited

UNITED STATES PATENTS

| | | | |
|---|---|---|---|
| 2,721,233 | 10/1955 | Johnson | 179/18 GE |
| 2,767,250 | 10/1956 | Blackhall et al. | 179/18 AA |
| 3,235,666 | 2/1966 | Ewin | 179/18 FC |
| 3,286,037 | 11/1966 | Kerr et al. | 179/18 FC |
| 3,387,279 | 6/1968 | Briley | 340/172.5 |
| 3,400,225 | 9/1968 | Erwin | 179/22 |
| 3,538,504 | 11/1970 | Higginbotham | 340/172.5 |
| 3,582,560 | 6/1971 | Banks et al. | 179/18 GE X |

*Primary Examiner*—Thomas W. Brown
*Attorney, Agent, or Firm*—Phillips, Moore, Weissenberger Lempio & Strabala

[57] ABSTRACT

A substantial reduction in blocking is achieved in a call concentrator, while increasing the number of subscribers served and reducing the number of trunks and relays required, as compared to prior art devices, by providing a linking bus network interposed between the subscriber lines and the trunks, and using separate line relay and trunk relay matrices to interconnect the lines and trunks with the linking bus network. Substantial reductions in cost of installations serving less than the maximum number of lines are effected by placing all matrix components on plug-in printed circuit boards so that the smaller installations may be served by partially equipped matrices, and growth easily accommodated without service interruption. The costs of providing reliable power for the matrix are reduced through the use of magnetically latched relays in the matrix.

9 Claims, 5 Drawing Figures

CALL CONCENTRATOR SWITCHING MATRIX

REFERENCE TO RELATED APPLICATIONS

Other aspects of the call concentrator of this invention are disclosed in copending applications Ser. No. 263,945, filed June 19,1972, entitled CALL CONCENTRATOR WITH EXPANDED INTRACALL CAPABILITY (intercall, supervisory, and remote power circuitry); and Ser. No. 264,513, filed June 20, 1972, now abandoned, entitled CALL CONCENTRATOR CONTROL SYSTEM (operation of the control units).

BACKGROUND OF THE INVENTION

With rapid growth of suburban or rural communities remote from the nearest telephone central office, call concentrators have assumed increased importance in recent years. Briefly, the function of the call concentrator is to provide a switching capability at a remote location so that a large number of remote subscriber lines can be concentrated into a much smaller number of trunks extending between the remote location and the central office. At the central office end, an inverse switching capability is provided to distribute the calls on the trunks back to the proper subscriber lines leading into the central office circuitry.

Although call concentrators as such are old in the art, economical considerations make it ever more imperative to provide service to the greatest possible number of subscribers with the least possible equipment. One limiting factor in the service capability of a concentrator is the amount of blocking, i.e., the statistical probability that a caller will find all the trunks accessible to him busy, and will consequently fail to get an immediate dial tone. From a service point of view, the best way of reducing blocking is to make all trunks directly accessible to all subscriber lines, but this would require too many switching elements to be economically feasible.

Various solutions to the problem have been proposed. A typical one involves a 96-line concentrator feeding into 24 trunks (the number of trunks in a standard pulse-code-modulated transmission line). Each subscriber line has direct access to six of the 24 trunks. The particular set of trunks corresponding to a given subscriber line is permanently assigned to it. Consequently, if the six trunks accessible to any given line are busy, a block occurs even if all of the other 18 trunks are idle. However, the statistical probability of a block occurring in this system is sufficiently low to make the system commercially useable. Inasmuch as one crosspoint (i.e., one separately operable relay) is needed for each trunk access on each line, the prior art switching matrix requires 672 relays (including an off-hook detector relay for each line), which are not only expensive but also consume a considerable amount of power.

SUMMARY OF THE INVENTION

The switching matrix of this invention makes it possible to serve 112 subscriber lines with only 21 trunks while substantially reducing the blocking probability; yet only 399 relays are required in the inventive matrix. By using magnetically latching relays, the power consumption of the matrix can be reduced to near zero.

Inasmuch as the major part of the concentrator's cost lies in the switching matrix rather than in the electronic control circuits, the matrix of this invention is particularly economical because it permits quick and easy addition or removal of individual line and trunk boards as service requirements dictate, without requirring any modification or adjustment of the existing equipment.

The fact that the inventive matrix uses only 21 of the 24 trunks of a T–1 carrier system makes it possible to provide special unswitched services over the remaining three trunks when such a system is used with the concentrator, a capability not obtainable in the prior art systems.

The invention achieves its advantageous results in a way which, at first glance, appears to complicate the switching arrangement rather than simplify it. Instead of providing direct access between the subscriber lines and the trunks, the invention interposes a network of linking buses between the subscriber lines and the trunks, and makes the linking buses accessible separately to the subscriber lines and to the trunks. In this manner, all 21 trunks are accessible to all 112 subscriber lines, and a block will normally occur only if all 21 trunks are busy or if all the linking buses accessible to a given subscriber line are in use. Inasmuch as 16 subscriber lines share each group of seven linking buses in the inventive matrix (as compared to 24 subscriber lines sharing six trunks in the prior art matrix), the blocking probability is considerably lessened.

In addition, the matrix of the invention eliminates the need for an off-hook detector relay on each subscriber line by using the matrix relays themselves for the off-hook detection function.

It is therefore the object of the invention to provide a switching matrix for a call concentrator which uses a network of linking buses separately accessible to the subscriber lines and the trunks so as to make all trunks accessible to all subscriber lines with a minimum of relays.

It is another object of the invention to provide a switching matrix of the type described in which the off-hook relay detector function is performed by the matrix relays.

It is a further object of the invention to provide a switching matrix of the type described using magnetically latching relays to substantially reduce power consumption of the matrix.

It is yet another object of the invention to provide a concentrator in which the capacity of the concentrator can be increased simply by plugging in additional printed circuit boards, without any modification of existing equipment or interruption of service.

and

Figure 5:
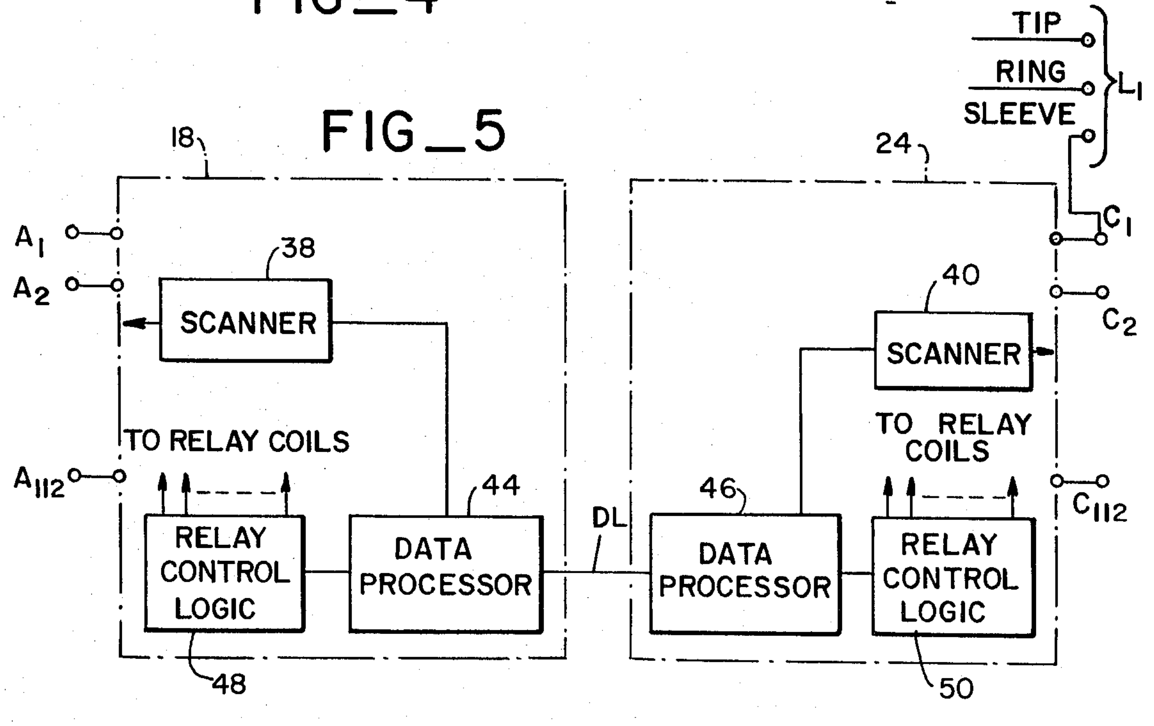

FIG. 5 is a block diagram illustrating the control system for the relays of the inventive matrix.

DESCRIPTION OF THE PREFERRED EMBODIMENT

Figure 1:
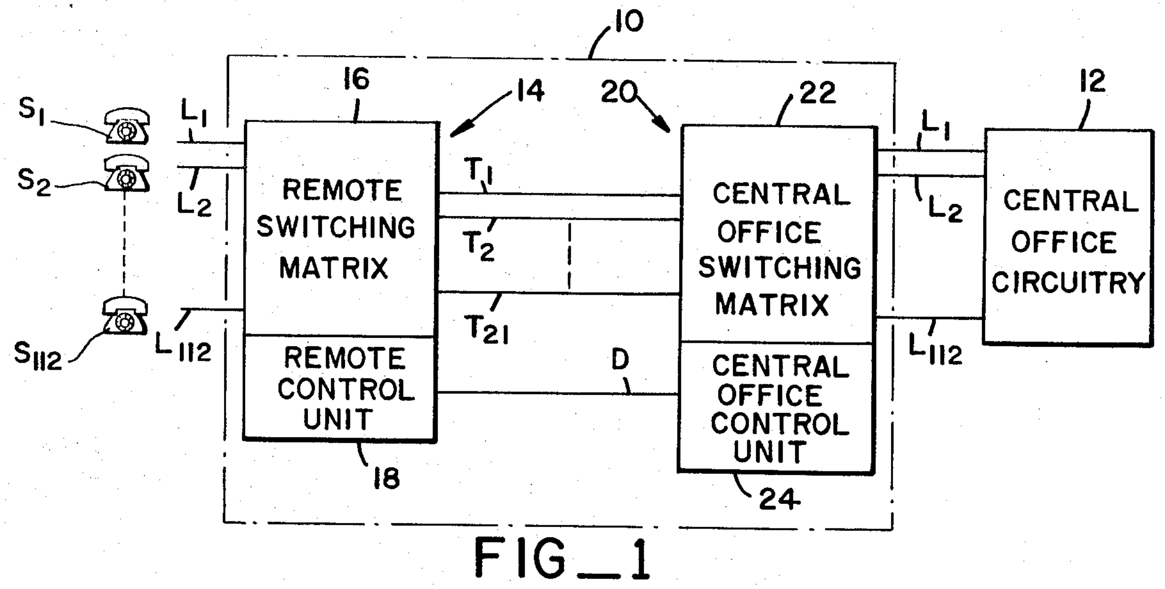
FIG. 1 is a general block diagram illustrating the environment in which the invention is used.

FIG. 1 shows the environment of the invention. The call concentrator 10 is interposed in subscriber lines $L_1$ through $L_{112}$ between the remotely located subscriber stations $S_1$ through $S_{112}$ and the central office circuitry 12 which provides the conventional interface between subscriber lines and the telephone network.

The call concentrator 10 consists of a remote unit 14 composed essentially of a remote switching matrix 16 and a remote control unit 18, and a central office unit 20 composed essentially of a central office switching matrix 22 and a central office control unit 24. The switching matrices 16, and 22 are interconnected by 21 (in the preferred embodiment) trunks $T_1$ through $T_{21}$, while the control units 18 and 24, shown in more detail in FIG. 5, are interconnected by a data link DL. The data link DL and the trunks $T_1$ through $T_{21}$ would normally be contained in a single (conventional or multiplexed) cable extending between the remote unit 14 and the central office unit 20.

Figure 2:
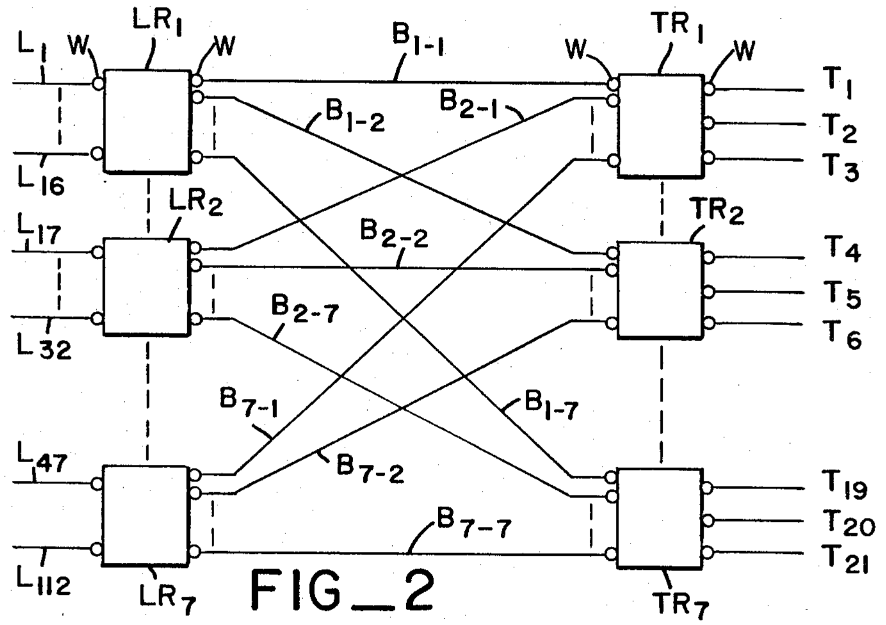
FIG. 2 is a block diagram showing the layout of the inventive matrix.

Except for being the mirror image of one another, switching matrices 16 and 22 are identical. FIG. 2 is a block diagram of matrix 16. It will be seen that the 112 subscriber lines are divided into seven groups of 16 lines each. Each group is associated with one of the seven line relay boards $LR_1$ through $LR_7$. Likewise, the 21 trunks are divided into seven groups of three trunks each, each trunk group being associated with one of the seven trunk relay boards $TR_1$ through $TR_7$.

The line relay boards $LR_1$ through $LR_7$ are connected to the trunk relay boards $TR_1$ through $TR_7$ by a set of 49 linking buses $B_{1-1}$ through $B_{7-7}$ (In the notation of this description, $B_{1-1}$ designates the bus linking $LR_1$ to $TR_1$, $B_{1-2}$ designates the bus linking $LR_1$ to $TR_2$, etc.). Thus, each subscriber line can be connected to each trunk and vice versa.

Figure 3:
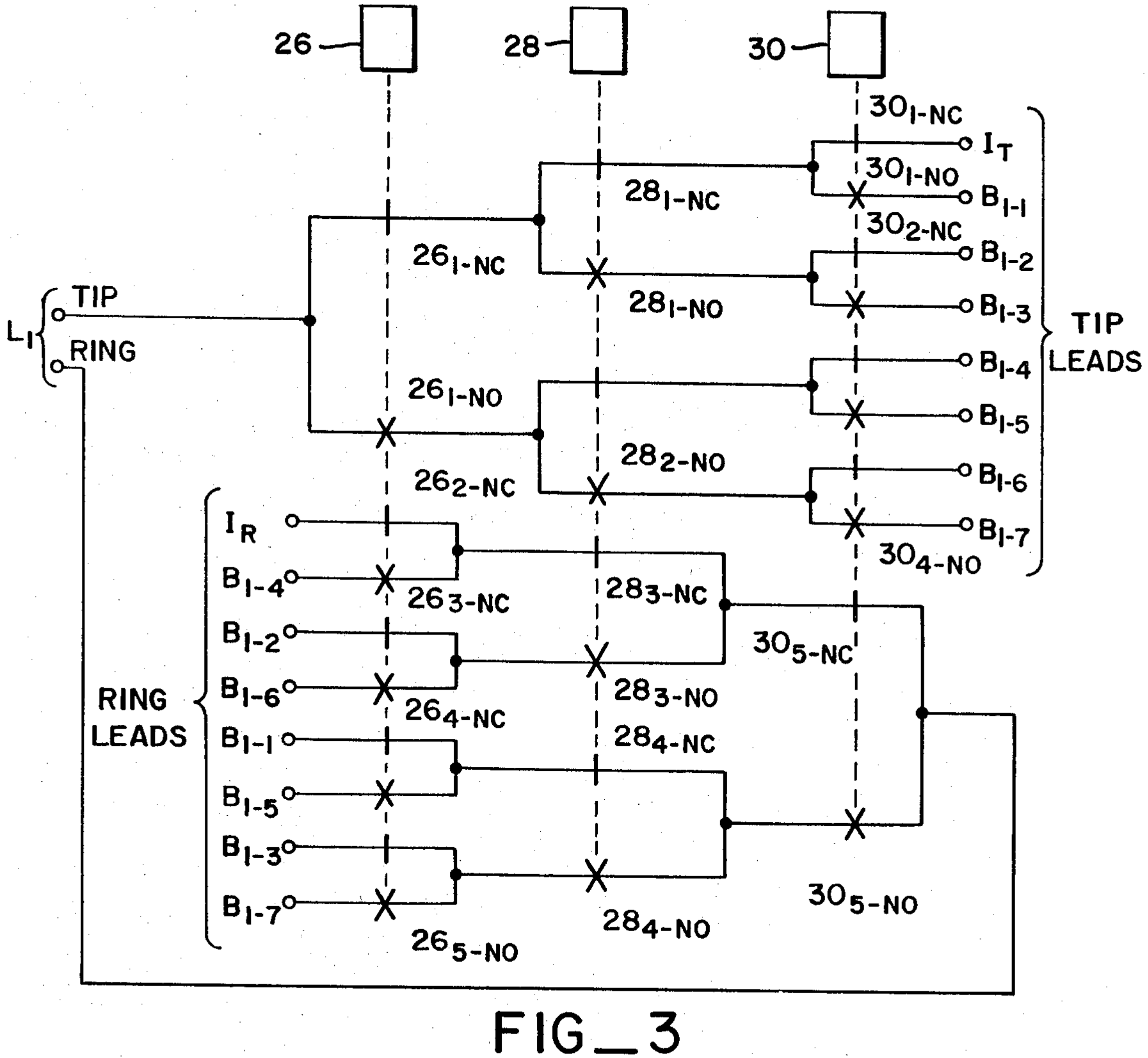
FIG. 3 is a circuit diagram showing the interconnections of a relay tree associated with a subscriber line in the matrix of FIG. 2.

The manner in which the line or trunk connections to the linking buses is accomplished is shown in FIG. 3, which shows a relay tree composed of three relays 26, 28, 30 associated with subscriber line $L_1$. The matrix of this invention requires 133 such relay trees, one for each subscriber line and one for each trunk. The relays 26, 28, 30 may be of the generally available six-contact-pair type, and in order to save power and simplify the control circuitry (particularly at the remote unit 14), they are preferably of the magnetically latching type so as to require only a short current pulse for operation and another short current pulse for release.

Five contact pairs identified by the suffixes 1–NC and 1–NO through 5–NC and 5–NO are used on relays 26 and 30, whereas four contact pairs designated 1–NC and 1–NO through 4–NC and 4–NO are used on relay 28. Seven of the eight possible position combinations of relays 26, 28, 30 are active combinations used to connect the subscriber line or trunk to which the relay tree belongs to the seven linking buses associated with the line board or trunk board to which that line or trunk belongs.

For example, if relay 30 is operated and relays 26 and 28 released, the tip lead of line $L_1$ is connected to the tip lead of bus $B_{1-1}$ through contacts $\mathbf{26}_{1-NC}$, $\mathbf{28}_{1-NO}$. The ring lead of line $L_1$ is simultaneously connected to the ring lead of bus $B_{1-1}$ through contacts $\mathbf{39}_{5-NO}$, $\mathbf{28}_{4-NC}$ and $\mathbf{26}_{4-NC}$.

Similarly, the operation of relay 28 and release of relays 26 and 30 established a connection between $L_1$ and $B_{1-2}$ (tip via $\mathbf{26}_{1-NC}$, $\mathbf{28}_{1-NO}$ and $\mathbf{30}_{2-NC}$, ring via $\mathbf{30}_{5-NC}$, $\mathbf{28}_{3-NO}$ and $\mathbf{26}_{3-NC}$); and the operation of all three relays connects $L_1$ to $B_{1-7}$(tip via $\mathbf{26}_{1-NO}$, $\mathbf{28}_{2-NO}$ and $\mathbf{30}_{4-NO}$; ring via $\mathbf{30}_{5-NO}$, $\mathbf{28}_{4-NO}$ and $\mathbf{26}_{5-NO}$).

Figure 4:
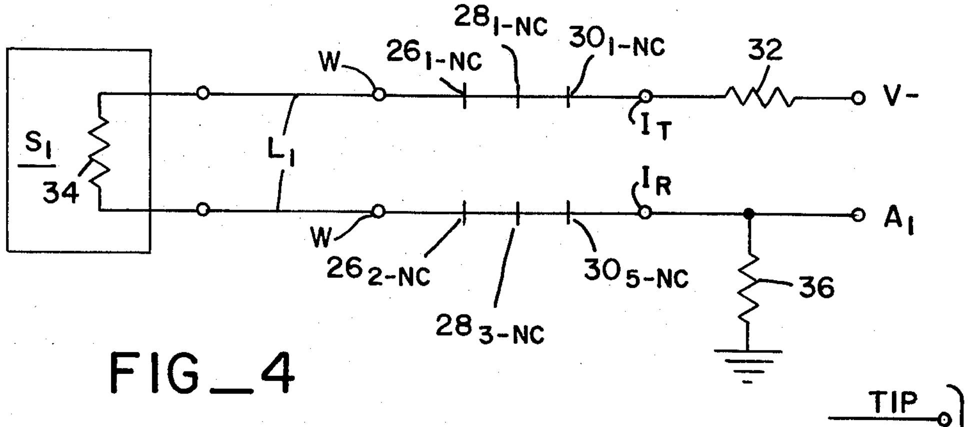
FIG. 4 is a circuit diagram illustrating the use of the relay tree of FIG. 3 to perform the off-hook detecting function.

The eighth combination (all three relays released) in the relay trees of $LR_1$ through $LR_7$ is a neutral combination and carries out the functions of a service request detector relay as shown in FIG. 4. With relays 26, 28 and 30 all released, a connection is established, when subset $S_1$ is idle, from the $V^-$ supply through resistor 32, terminal $I_T$, contacts $\mathbf{30}_{1-NC}$, $\mathbf{28}_{1-NC}$, and $\mathbf{26}_{1-NC}$, the tip lead of subscriber line $L_1$, the on-hook resistance of subset $S_1$, the ring lead of subscriber line $L_1$, contacts $\mathbf{26}_{2-NC}$, $\mathbf{28}_{3-NC}$ and $\mathbf{30}_{5-NC}$, terminal $I_R$, and load resistor 36 to ground. As a result, terminal $A_1$ is at a predetermined potential below ground, say −10 volts. When the subset $S_1$ goes off hook (i.e., initiates a service request), the circuit is broken and $A_1$ goes to ground. The scanner 38 of FIG. 5 recognizes the grounding of $A_1$ on the next scan and initiates the necessary procedures through the control unit 18 to establish a connection to the central office. Resistors 32 and 36 are preferably located on the line relay board of the relay tree to which they belong.

FIG. 5 illustrates the operation of the control units, which may be of conventional design. The scanners 38, 40 continuously scan the remote subscriber line terminals A and the central office subscriber line C-lead terminals C, respectively. As soon as scanner 38 or 40 detects a line seizure as described above on the remote side or by the grounding of a C-lead on the central office side, it reports the identity of the seized line to the data processors 44 and 46 which are linked by the data link DL. The data processors thereupon actuate the appropriate combination of relays through relay control logic 48 or 50. Proper idle trunks are selected on the basis of information stored in data processors 44, 46.

An important advantage of the matrix of this invention is its ability to function in a partially equipped condition. For example, if a concentrator is installed to serve a slowly growing community at a remote location, the concentrator may at first be equipped with, say, four line relay boards $LR_1$ through $LR_4$ and four trunk relay boards $TR_1$ through $TR_4$ to provide service to 64 subscribers. Wiring connectors W, A, V- for all lines and trunks, the 49 linking buses, and a complete control unit and power supply are provided from the outset.

In such a case, terminating calls to lines $L_{65}$ through $L_{112}$ are intercepted at the central office and handled by the no-such-number circuitry before they ever reach the concentrator; scanner terminals $A_{65}$ through $A_{112}$ are dead and cannot provide the ground connection necessary to initiate a service request; and the memory cells assigned to the missing trunks in the data processors 44, 46 are shorted out by make-busy switches (not shown in this application but described in copending application Ser. No. 264,513, filed June 20, 1972, entitled CALL CONCENTRATOR CONTROL SYSTEM). As a result, a service request will always be routed to an existing trunk, as the memory simply considers the missing trunks to be busy and keeps searching for an available trunk.

When traffic increases to the point where more equipment is needed, it is a simple matter to install additional trunks and subscriber lines, plug in additional line relay boards and trunk relay boards (which, for this reason, are preferably built in the form of plug-in printed circuit boards), and throw the make-busy switches to "off." The concentrator is then immediately ready to handle the additional traffic without wiring modification, adjustment, or service interruption.

In the same manner, line and trunk relay boards can be easily removed or exchanged for repairs without affecting the operation of the concentrator. Inasmuch as the bulk of the cost of the concentrator resides in the relay boards and in the trunks themselves, it will be seen that the modular construction of the system permits significant economies in many installations.

What is claimed is:

1. A call concentrator comprising:
a. s subscriber lines;
b. t trunk lines, t being smaller than s; and
c. relay means for interconnecting said subscriber lines and said trunk lines; said relay means including:
i. a group of n line relay boards;
ii. a group of n trunk relay boards; and
iii. a group of $n^2$ linking buses, each linking bus connecting one of said line relay boards to one of said trunk relay boards;
iv. each line relay board being composed of $s/n$ line relay trees each associated with one of said subscriber lines, and each trunk relay board being composed of $t/n$ trunk relay trees, each associated with one of said trunk lines, said relay trees being arranged to interconnect said linking buses with said subscriber lines and trunk lines.

2. The device of claim 1, in which $n = 2^m - 1$, $m$ being a positive integer, and in which each said relay tree consists of $m$ relays, said relays being individually switchable to provide each relay tree with $2^m$ combinations of relay positions, one of said combinations being a neutral condition in which said relay tree establishes a connection indicative of an idle or service request on its subscriber line, the n other combinations being active conditions in which the relay tree connects its subscriber or trunk line with one of said linking buses for talking purposes.

3. The device of claim 2, in which $m = 3$, $n = 7$, $s = 112$, and $t = 21$.

4. The device of claim 2, further comprising a set of terminals, one terminal being connected to each subscriber line through the line relay tree associated with that line when the line relay tree is in its neutral condition, scanning means cyclically sequentially connectable to said terminals, a voltage source, and means connecting said voltage source to each said terminal through the contacts of the relay tree associated therewith which are closed in the neutral condition of said relay tree, and through the line associated therewith so as to change the voltage at said terminal when said relay tree switches from said neutral condition to an active condition or when the subscriber set associated therewith goes off-hook while said line relay tree is in its neutral condition.

5. The device of claim 2, in which said relay boards are plug-in printed circuit boards, and in which said lines, trunks, and linking buses are wired to connectors into which said boards are plugged in such a manner that said concentrator may be operated in a partially equipped condition to serve a smaller number of lines than its full-capacity complement.

6. The device of claim 2, in which said relays are of the magnetic latching type.

7. A call concentrator comrising:
a. s subscriber lines;
b. t trunk lines, $t$ being smaller than $s$; and
c. relay means for interconnecting said subscriber lines and said trunk lines; said relay means including:
i. a group of n line relay boards;
ii. a group of n trunk relay boards; and
iii. a group of $n^2$ linking buses, each linking bus connecting one of said line relay boards to one of said trunk relay boards;
iv. each line relay board being composed of $s/n$ line relay trees each associated with one of said subscriber lines, and each trunk relay board being composed of $t/n$ trunk relay trees, each associated with one of said trunk lines, said relay trees being arranged to interconnect said linking buses with said subscriber lines and trunk lines; and
v. said relay trees consisting of $m$ relays each arranged to switch both the tip and the ring lead of the line associated therewith between $2^m$ position combinations, the first of said relays having $2^0$ tip contacts and $2^{m-1}$ ring contacts, the second relay having $2^1$ tip contacts and $2^{m-1}$ ring contacts, and so forth to the last relay having $2^{m-1}$ tip contacts and $2^\circ$ ring contacts.

8. The method of connecting s telephone subscriber lines to $t$ trunk lines, $t$ being substantially smaller than $s$, comprising the steps of:
a. grouping said subscriber lines into n subscriber line boards, $n$ being substantially smaller than $t$;
b. grouping said subscriber lines into $n$ trunk line boards;
c. linking said subscriber line boards to said trunk line boards by only $n^2$ interconnecting links;
d. selectively connecting each subscriber line going off-hook on a given subscriber line board to a separate trunk line board through any interconnecting link connected to said given subscriber line board and not in use.

9. A call concentrator comrising:
a. $s$ subscriber lines;
b. t trunk lines, $t$ being smaller than $s$;
c. relay means for interconnecting said subscriber lines and said trunk lines; said relay means including:
i. a group of $n$ line relay boards;
ii. a group of $n$ trunk relay boards; and
iii. a group of $n^2$ linking buses, each linking bus connecting one of said line relay boards to one of said trunk relay boards;
iv. each line relay board being composed of $s/n$ line relay trees each associated with one of said subscriber lines, and each trunk relay board being composed of $t/n$ trunk relay trees, each associated with one of said trunk lines, said relay trees being arranged to interconnect said linking buses with said subscriber lines and trunk lines;
v. each said relay tree consisting of m relays, $m$ being a positive integer with $n = 2^m - 1$, said relays being individually switchable to provide each relay tree with $2^m$ combinations of relay positions, one of said combinatins being a neutral condition in which said relay tree establishes a connection indicative of an idle or service request on its subscriber line, the n other combinations being active conditions in which the relay tree connects its subscriber or trunk line with one of said linking buses for talking purposes;

d. a set of terminals, each terminal being connected to one of said subscriber lines through one of said line relay trees when that line relay tree is in its neutral condition;

e. scanning means cyclically sequentially connectable to said terminals;

f. a voltage source; and g. means connecting said voltage source to each said terminal through the contacts of the relay tree associated therewith which are closed in the neutral condition of said relay tree, and through the line associated therewith so as to change the voltage at said terminal when said relay tree switches from said neutral condition to an active condition or the subscriber set associated therewith is off-hook when said line relay tree is in its neutral condition, h. said voltage source being connected through the on-hook resistance of the subscriber set in series with a load resistor, said on-hook resistance and load resistor forming a voltage divider, and said idle terminal being connected to a point between said on-hook resistance and said load resistor.

* * * * *